(12) United States Patent
Davis et al.

(10) Patent No.: US 6,712,475 B2
(45) Date of Patent: Mar. 30, 2004

(54) HOUSING AND INTERNAL LAYOUT FOR COMPACT SLM-BASED PROJECTOR

(75) Inventors: Michael T. Davis, Richardson, TX (US); John T. McKinley, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/945,294

(22) Filed: Aug. 31, 2001

(65) Prior Publication Data

US 2002/0024637 A1 Feb. 28, 2002

Related U.S. Application Data

(60) Provisional application No. 60/229,827, filed on Aug. 31, 2000.

(51) Int. Cl.$^7$ .............................................. G03B 21/14
(52) U.S. Cl. ........................... 353/119; 353/37; 353/98
(58) Field of Search ............................ 353/119, 31, 37, 353/77, 98

(56) References Cited

U.S. PATENT DOCUMENTS

| | | | | |
|---|---|---|---|---|
| 5,642,927 A | * | 7/1997 | Booth et al. | 353/101 |
| 5,798,866 A | * | 8/1998 | De Vaan | 359/621 |
| 5,876,105 A | * | 3/1999 | Rodriquez, Jr. | 353/119 |
| 5,986,634 A | * | 11/1999 | Alioshin et al. | 345/168 |
| 6,179,426 B1 | * | 1/2001 | Rodriguez et al. | 353/119 |
| 6,231,191 B1 | * | 5/2001 | Shiraishi et al. | 353/119 |

* cited by examiner

Primary Examiner—Russell Adams
Assistant Examiner—Michelle Nguyen
(74) Attorney, Agent, or Firm—Charles A. Brill; Wade James Brady, III; Frederick J. Telecky, Jr.

(57) ABSTRACT

A display system based on a spatial light modulator (SLM). Various embodiments of the invention all involve some sort of articulating element, such that the display system has a stow position that is more compact and different from its operating position. In the operating position, the image formed by the SLM is re-oriented, if necessary, to a position suitable for viewing.

6 Claims, 4 Drawing Sheets

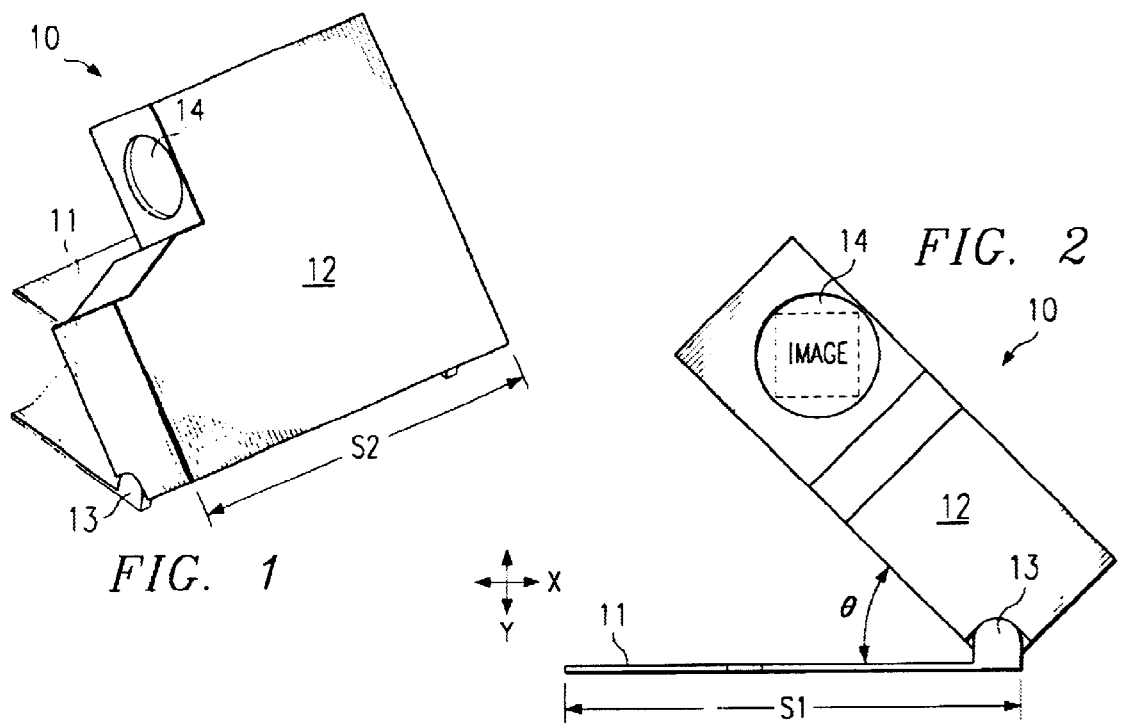
FIG. 1
FIG. 2
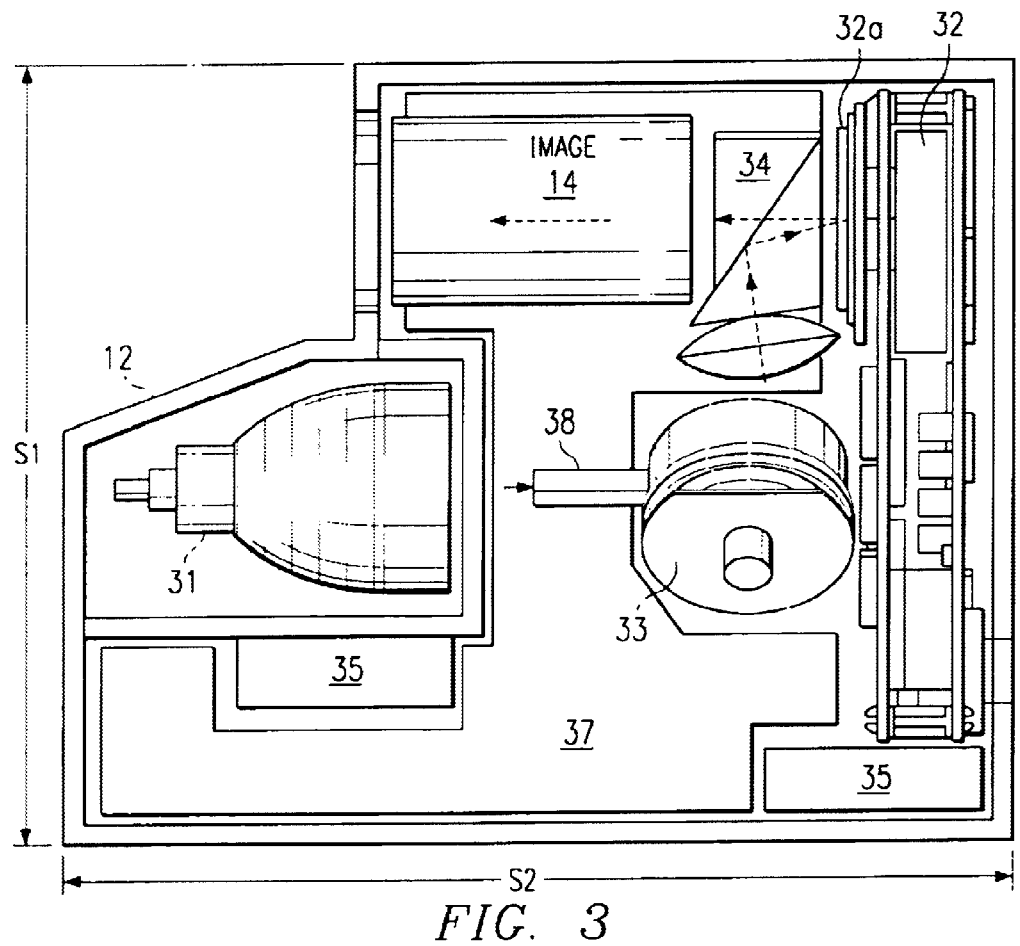
FIG. 3

HOUSING AND INTERNAL LAYOUT FOR COMPACT SLM-BASED PROJECTOR

This application claims priority under 35 USC §119(e)(1) of provisional application No. 60/229,827 filed Aug. 31, 2000.

TECHNICAL FIELD OF THE INVENTION

This invention relates to projection display systems, and more particularly to SLM-based projection display systems that are portable and minimal in size.

BACKGROUND OF THE INVENTION

Current projection display systems are made with a variety of different image generating devices. One type of image generating device suitable for projection display systems is a spatial light modulator (SLM). SLM's are arrays of pixel elements, each of which is individually addressable with image data. An image is generated by addressing all pixel elements at once, such that each is on or off. Various modulation schemes may be used to provide greyscale. SLMs include both reflective and transmissive devices.

A DMD™ is a type of reflective SLM, having an array of tiny mirrors. Each mirror can be tilted to an on position or an off position. Each image is generated by switching the appropriate mirrors on or off and by modulating the time that the on mirrors are on. Images can be generated in such a fast sequence that the viewer perceives motion.

Color may be added to the images by filtering the source illumination through a motorized color filter wheel. The color filter wheel spins in sequence with the images' corresponding red, green, or blue data. Mirrors are turned on or off depending on how much of each color is needed per pixel. As an alternative to, or in addition to, a color filter wheel, multiple DMDs can be used. The projection system has an optical path that comprises the source of illumination, illumination optical elements, the color filter wheel, the DMD, a projection lens, and other optical elements.

Each DMD mirror element has a square surface area. Each DMD mirror element rotates about a hinge axis that is along the diagonal of the square, rather than along a cartesian axis parallel to the pixel sides. As a result, the light that illuminates the mirror elements must be incident to the mirror elements about an axis essentially orthogonal to this 45 degree diagonal in order to exit the mirror in the proper direction for projection. For display, in order to provide correctly oriented images, the SLM must be oriented with the pixel array squarely aligned to the display screen, therefore the architecture of the illumination system must include folds in the optical path. This is accomplished with mirrors and other optical devices that redirect the optical path. These folds tend to dictate the size of the optical unit, and therefore the size of the projector. They also tend to create areas of wasted space within the projector housing.

SUMMARY OF THE INVENTION

One aspect of the invention is an SLM (spatial light modulator)-based projection display system. The display system is contained in a two-part housing, one part being an articulating unit and the other being a stationary platform. Articulation is achieved by rotation, translation, or a combination of rotation and translation relative to the stationary base. The articulating unit contains at least some or all of the optical components of the display system, including the SLM. The articulating unit is moveable from a stow position to an operating position at an angle or displacement relative to the stow position. The articulating unit is placed in the operating position during use of the display system, which causes images formed by the SLM to be oriented at a position suitable for viewing. The platform unit rests on a flat surface when the projection display system is in use and supports the articulating unit. A joint mechanism, such as a hinge, attaches the articulating unit to the platform unit, and some sort of locking mechanism holds the articulating unit in place when the articulating unit is in the operating position.

An advantage of the invention is that it permits the form factor for SLM-based projectors to be minimized, particularly in the height dimension, when in the stow condition. The projector can be stowed to a minimal form factor when not in use, but opened up to the correct optical path when in use. In the stow position, the optical path can be packaged within parallel planes less than two inches apart. Because the optical path has previously driven the projector height, the entire projector can now be much slimmer and smaller overall, facilitating portability. The two inch height (or less) now made possible is much smaller than the four inch height or so required for previous designs having "stationary" optical paths.

Most of the embodiments described herein also eliminate the use of a fold mirror to re-orient the image or facilitate packaging. This in turn eliminates degradation of optical efficiency and lengthening of the overall optic path that would otherwise be caused by the fold mirror.

BRIEF DESCRIPTION OF THE DRAWINGS

FIG. 1 is a perspective view of a projector housing in accordance with the invention.

FIG. 2 is a front view of the projector housing of FIG. 1.

FIG. 3 illustrates the internal components within the articulating unit of the housing of FIGS. 1 and 2.

DETAILED DESCRIPTION OF THE INVENTION

Overview

Figure 4:
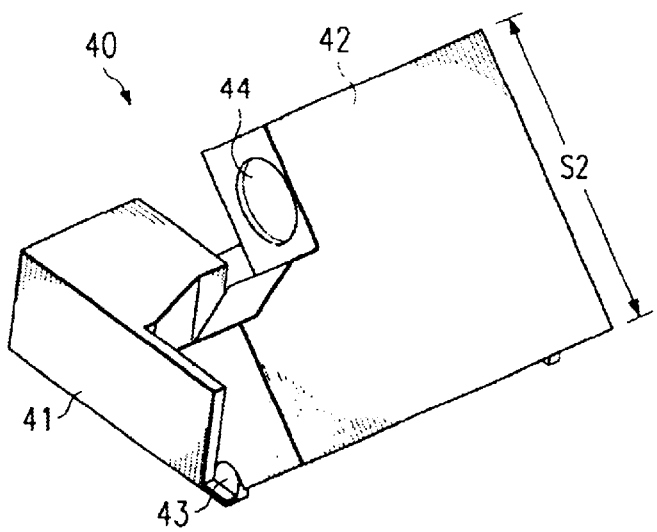
FIG. 4 is a perspective view of a second projector housing in accordance with the invention.

The various aspects of the invention described herein are directed to minimizing the form factor for an SLM-based projection display system. Each of the various embodiments makes use of a housing having an articulated structure that permits internal components to be re-oriented when the projector is in use. These re-oriented components provide a particular light path from an illumination source to the projection lens. This light path results in an image that appears in the correct position on a viewing screen. When not in use, the housing can be mechanically repositioned to a compact stow configuration for maximum portability.

The various embodiments differ with respect to which internal components are repositioned when the projector is in use. Some embodiments reposition more of the internal components than others, with a corresponding increase in the portion of the housing that is moveable. However, in all embodiments, it is at least some portion of the elements that contribute to the light path that are repositioned. In general, during use, the light path is "folded", not by using a stationary fold mirror, but by articulating the internal structure. This eliminates one or more stationary folds that would otherwise be required.

For purposes of example, the various embodiments are described herein in terms of a DMD-based projection system. As explained in the Background, the operating characteristics of a DMD are such that the light path must be folded to present a properly oriented image at the screen. However, the same concepts could be applied to projection systems that use other SLM devices to generate images, such as reflective LCD or grating arrays, having a similar folding requirement for the light path.

Housing with Rotating Unit

FIGS. 1 and 2 illustrate a first projector housing 10 in accordance with one aspect of the invention. FIG. 1 is a perspective view; FIG. 2 is a front view. In both FIGS. 1 and 2, housing 10 is shown in its operating position.

Housing 10 has two main parts, a base platform 11 and an articulating unit 12. As indicated by the direction arrow θ, articulating unit 12 may be rotated with respect to the platform 11. When the articulating unit 12 is rotated flat against the platform 11, housing 10 is in a stow position.

Articulating unit 12 contains all of the internal components of the projection system. Examples of layouts for the internal components within articulating unit 12 are described below in connection with FIGS. 3 and 7.

The surface area of platform 11 generally conforms to the bottom surface profile of rotating unit 12. In the embodiment of FIGS. 1 and 2, both platform 11 and articulating unit 12 have a cutout area in front of the projection lens 14.

Platform 11 may be simply a flat piece of rigid material. Various characteristics of platform 11, such as its weight, can be designed to contribute to the stability of articulating unit 12 when articulating unit 12 is raised to its operating position.

A hinge 13 permits articulating unit 12 to be rotated relative to platform 11. In the example of FIGS. 1 and 2, a single hinge runs along the entire side, S2, of articulating unit 12, but in other embodiments multiple hinges along that side could be used. Hinge 13 is placed along the side opposite projection lens 14. Hinge 13 is a self-locking hinge, such that when main housing is rotated to its operating position, hinge 13 keeps its "open" position and holds articulating unit 12 at the angle shown in FIGS. 1 and 2. Other mechanisms for holding hinge 13 in an open position, such as braces or supports, could be used.

Referring to FIG. 2, as indicated by the dotted lines within projection lens 14, when housing 10 is in the operating position, the image generated by the projection system SLM within housing 10 is correctly oriented. It is assumed that platform 11 is resting on a tabletop or other flat surface and that the viewing plane is on the same cartesian axis as the image and the platform. In other words, as indicated in FIG. 2, where housing 10 is in placed on a flat surface along an x axis, the viewing plane is an x-y plane. As can be imagined, if an image were to be generated with the internal components in the stow position, it would be at an angle to the viewing plane.

In the example of this description, the operating position of articulating unit 12 is at an angle of approximately 45 degrees from the plane of platform 11. In other words, by placing housing 10 in its operating position, the image generated by the DMD is rotated approximately 45 degrees. This angle "corrects" what would otherwise be a tilted orientation of the image and is related to the characteristics of the DMD. Other devices may call for different angles of the operating position. Various operating characteristics, such as the required illumination angle and tilt angle of the mirrors may affect the angle of the operating position.

FIG. 3 illustrates one example of a suitable layout for the components within articulating unit 12. These components within articulating unit 12 may be arranged such that a proper balance is facilitated when articulating unit 12 is raised to its operation position. For example, heavier components may be placed along side S1, nearer to hinge 13, than to the opposite side.

The source illumination is provided by a lamp 31. A color drum 33 filters the light from lamp 31 in the proper sequence of colors, in synchronization with the image data provided to DMD 32a. Color drum 33 is a type of color wheel, having its color filters on a cylinder rather than on a flat wheel. Color drum 33 also has additional optical elements for redirecting light, as shown by the optical path in FIG. 3. A flat color wheel could also be used. Integration optics 38 shapes the light from the source.

Prism optics 34 directs light from the color drum 33 to the DMD 32a, as well as from the DMD 32a to projection lens 14. The configuration of FIG. 3 has telecentric illumination optics, with prism optics 34 having a total internal reflection (TIR) prism that minimizes the size of the projection lens due to keystone correction by offset of the projection lens. However, the same concepts could be applied to non telecentric designs, but the offset requirements will have an additional effect on the illumination angle required.

Various electrical components, as well as the DMD 32a, are mounted on a printed circuit board 32. Other components mounted on board 32 include various memory and control devices.

The light path within housing 10 is shown with small directional arrows in FIG. 3. As explained above, the light path from the source 31 to DMD 32a is appropriate for the DMD 32a, but if an image were to be generated while housing 10 was in its stow position, the image would be rotated 45 degrees relative to the plane of housing 10.

The non-optical elements of the projection system include fans 35 and a power supply. Power supply 37 typically provides from an AC wall plug.

The ability of rotating unit 12 to be repositioned during use permits a compact configuration of the internal components of the projection system. Minimal dimensions can be achieved for a DMD projection system. A first side, S1, can be as short as 8 or 9 inches in length. A second side, S2, can be as short as 6 or 7 inches in length. The height of housing 10 can be as small as 2 to 3 inches.

Figure 5:
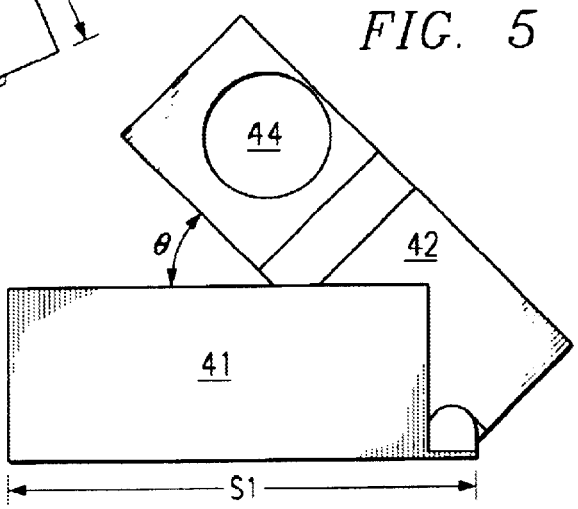
FIG. 5 is a front view of the projector housing of FIG. 4.
Figure 6:
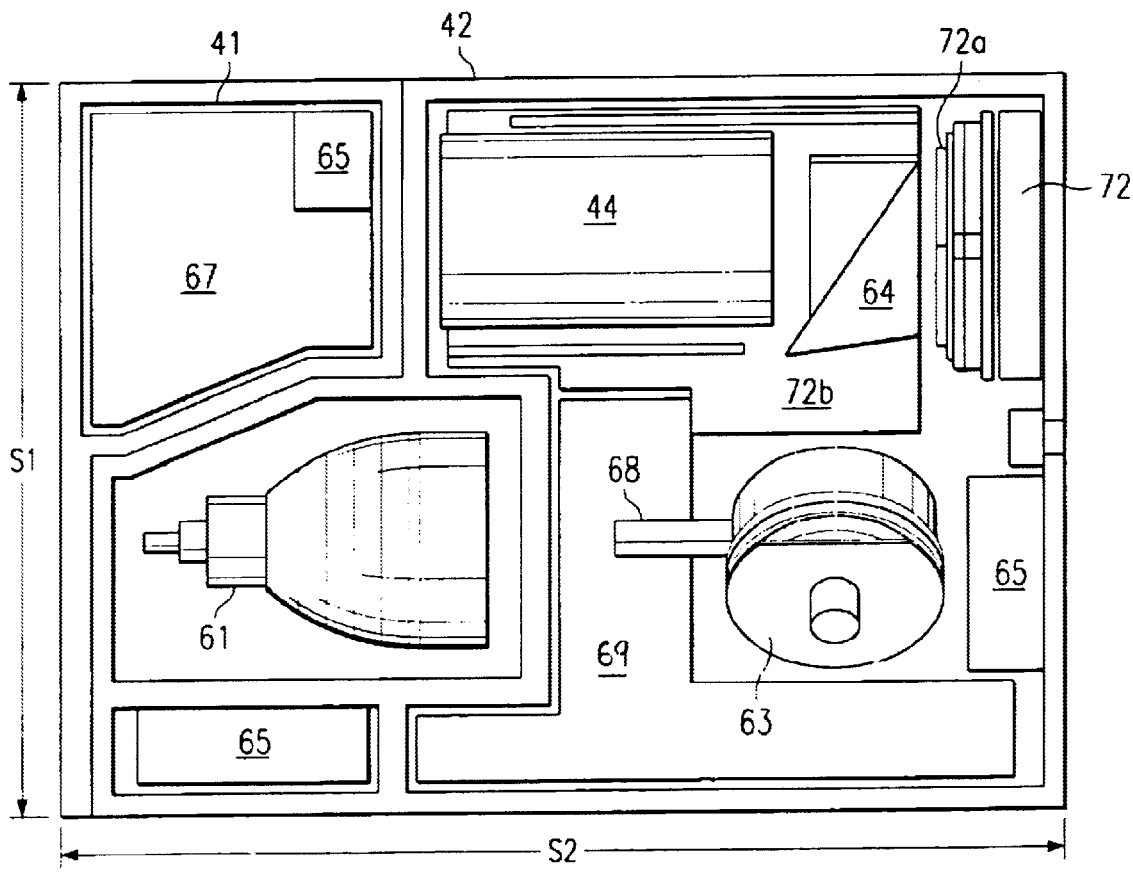
FIG. 6 illustrates the internal components within the articulating unit of the housing of FIGS. 4 and 5.

FIGS. 4–6 illustrate a second embodiment of the invention, a projector housing 40 having some but not all of its internal components in an articulating unit 42. Components not contained within articulating unit 42 are placed within platform unit 41. FIG. 4 is a perspective view, and FIG. 5 is a front view. In both FIGS. 4 and 5, housing 40 is in its operating position, rotated at an angle θ.

FIG. 6 illustrates one example of how the internal components of housing 40 may be arranged. Power supply 67, a relatively heavy component, is placed within platform unit 41. Thus, when housing 40 is in its operating position, power supply 67 remains stationary on the tabletop and does not rotate. A fan 65 is also placed within platform unit 41 to cool the power supply 65.

The components within articulating unit 42 have functions similar to those of like components within articulating unit 12. These components include all elements that contribute to the light path, that is, an illumination source 61, DMD 72a, integration optics 68, color drum 63, prism optics 64. and projection lens 44. Printed circuit board 72 does not necessarily contain all electrical components; in the embodiment of FIG. 6, board 72 is made smaller than the board 32 of FIG. 3 by placing some electrical components in a separate electrical unit 72b within rotating unit 42. Articulating unit 42 also contains two fans 65.

The housing 40 of FIGS. 4–6 will typically have slightly different dimensions than the housing 10 of FIGS. 1–3. If the dimensions are to be minimized, housing 40 is designed to have a first side, S1, as short as 6 or 7 inches, and a second side, S2, as short as 8 or 9 inches. The height is similar to that of housing 10.

Figure 7:
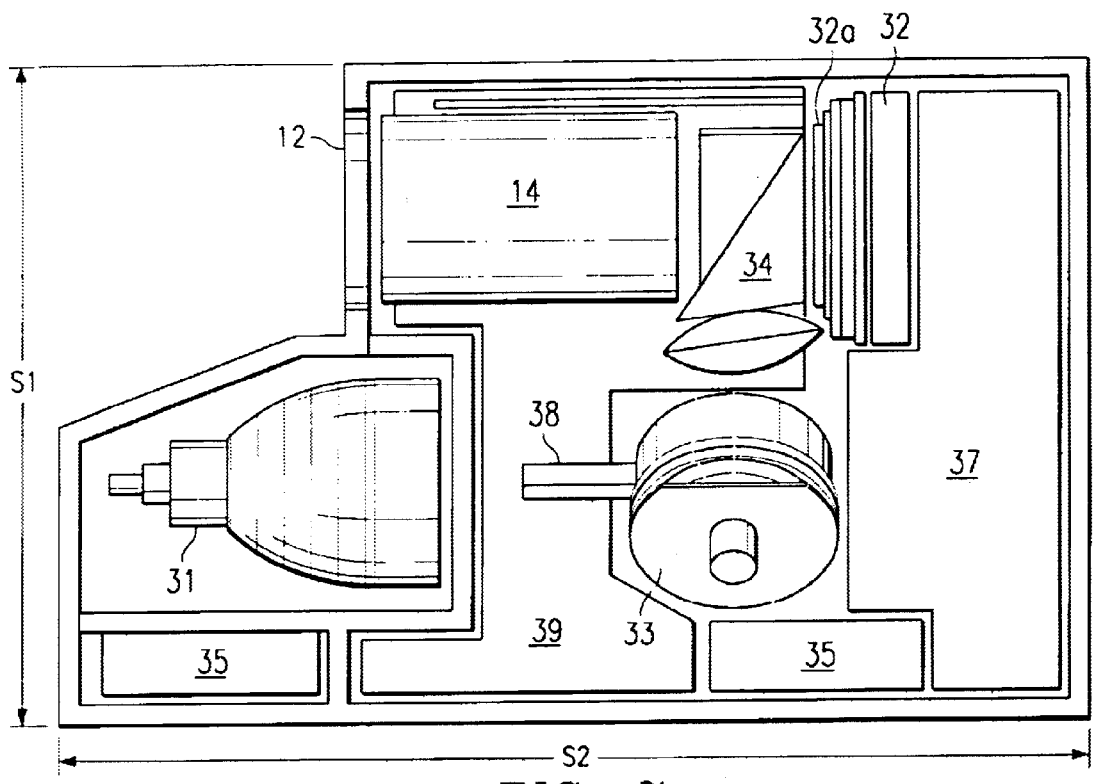
FIG. 7 illustrates an alternative arrangement of the components of FIG. 3.
Figure 8:
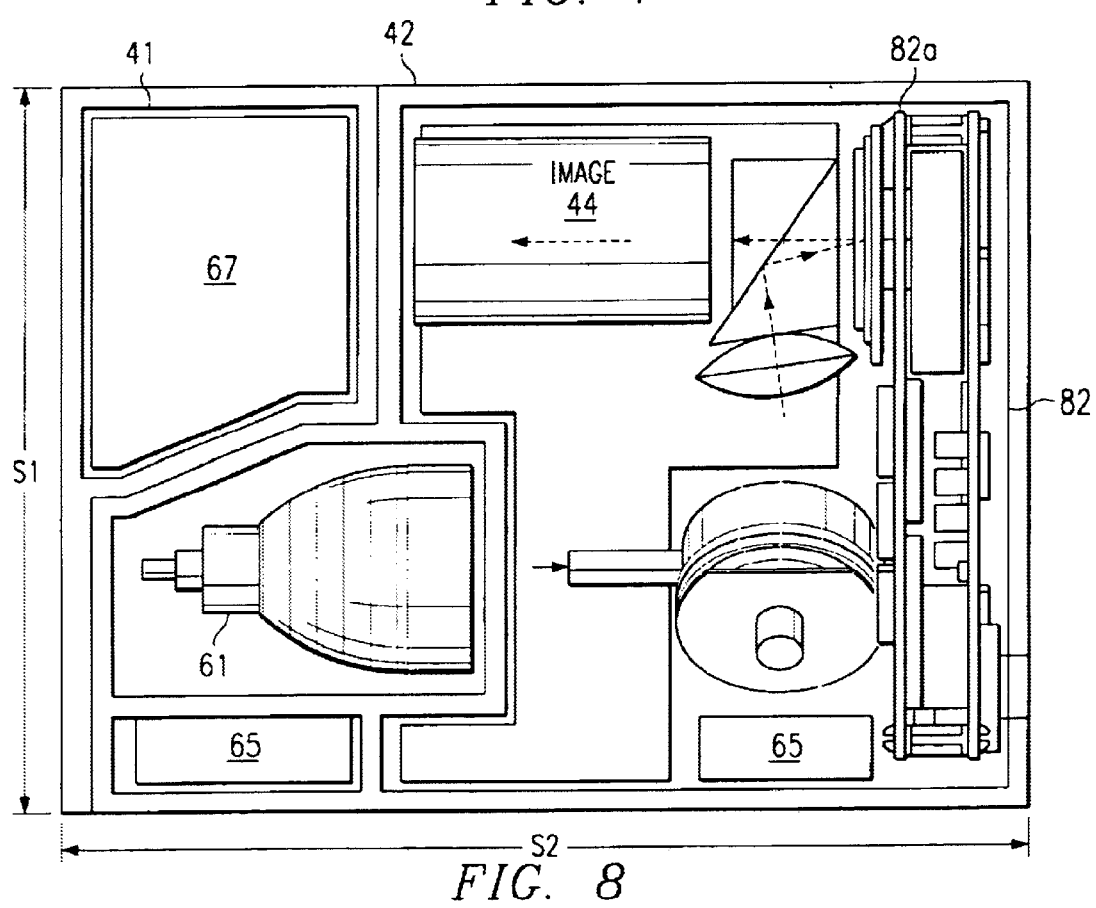
FIG. 8 illustrates an alternative arrangement of the components of FIG. 6.

FIGS. 7 and 8 illustrate different arrangements of the internal components of housings 10 and 40, respectively. In FIG. 7, as compared to FIG. 3, power supply 37 is in a different location within rotating unit 12. Printed circuit board 32 is smaller, with some of its components being located along side S2, in an electronics unit 39. In FIG. 8, as compared to FIG. 6, printed circuit board 82 is larger, containing the electrical components that are in the electrical unit 69 of FIG. 6. Although the height is minimized in the same manner as the embodiments described above, the "footprint" is about 6.5 inches by 10 inches (S1×S2) in the embodiment of FIG. 7, and about 7 inches by 9 inches in the embodiment of FIG. 8.

Housing with Repositionable Optical Unit

Figure 9:
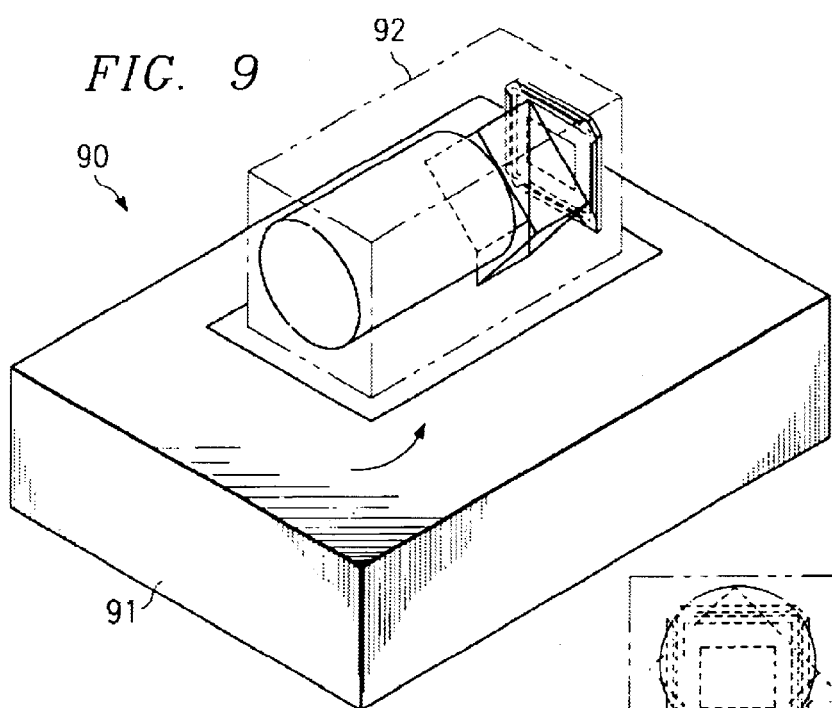
FIG. 9 is a perspective view of a third projector housing in accordance with the invention.
Figure 10:
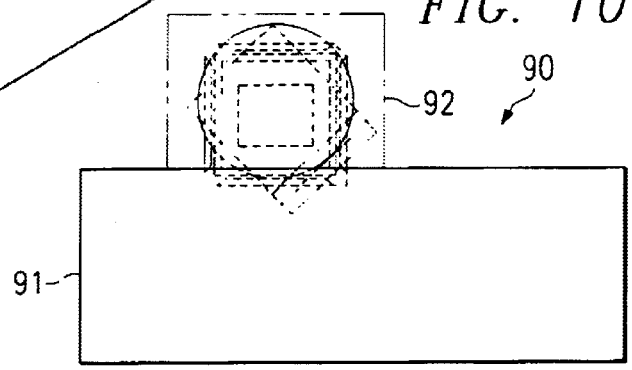
FIG. 10 is a front view of the projector housing of FIG. 9.
Figure 11:
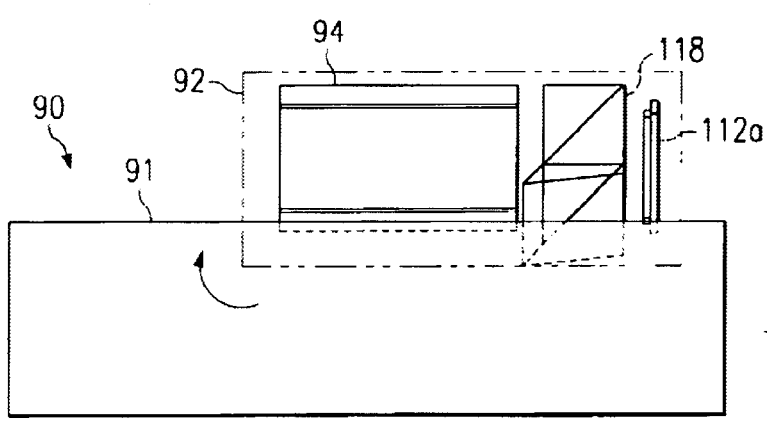
FIG. 11 is a side view of the projector housing of FIG. 9.

FIGS. 9–11 illustrate a third embodiment of the invention, a housing 90 having a repositionable optical unit 92 that contains only certain optical elements. FIGS. 9–11 each show housing 90 in the operating position, with optical unit 92 translated out of, and/or rotated with respect to, platform unit 91. FIG. 9 is a perspective view, FIG. 10 is a front view, and FIG. 11 is a side view.

The repositionable optical unit 92 contains the DMD 112a, the prism optics 118, and the projection lens 94. The lifting and rotation of optical unit 92 orients the image from DMD so it is correct relative to the viewing plane. Alternatively, optical unit 92 could be translated at an angle rather than rotated. In other embodiments, the stow position of optical unit 92 could be modified so that it may be simply translated upward for the operating position, or use some combination of translation and rotation to achieve operating position. Other than optical unit 92, the internal elements of housing 92 may be similar to those of the various embodiments described above.

Housing with Repositionable Fold Mirror

Figure 12:
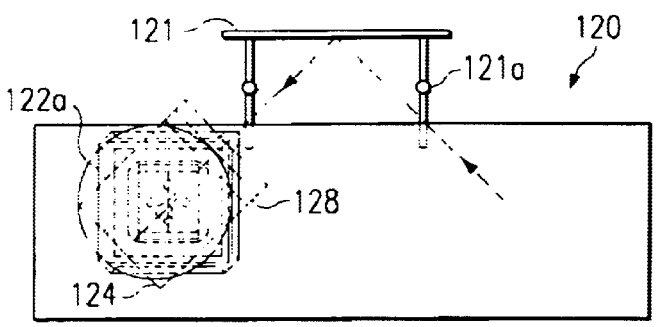
FIG. 12 is a front view of a fourth projector housing in accordance with the invention.

FIG. 12 is a front view of a further embodiment of the invention, a housing 120 having a pop-out fold mirror 121. Fold mirror 121 redirects (folds) the light from the source (not shown) to the DMD. When the pop-up mirror is stowed, the illumination optical path is interrupted and incomplete, thus light cannot properly reach the DMD. In this embodiment, the DMD remains in the stationary portion already correctly oriented to the viewing plane, whereas only a single optical element is repositioned to form a correctly oriented optical path.

Various spring type or hinge type or other type mechanisms 121a can be used to permit fold mirror 121 to be lifted from and securely positioned above housing 120. The internal components of housing 120 could be arranged in a manner similar to those of FIG. 3, with sufficient space in the optical path between the source illumination and the prism optics for the fold mirror.

Other Embodiments

Although the present invention has been described in detail, it should be understood that various changes, substitutions, and alterations can be made hereto without departing from the spirit and scope of the invention as defined by the appended claims. As there are many various components that comprise a complete projection system not covered in detail here, there are many possible combinations of these components which can be arranged to facilitate this concept. Once the concept of articulation is grasped as applied to stowing for portability, many other embodiments will become obvious in the details.

What is claimed is:

1. An SLM (spatial light modulator)-based projection display system, comprising:
   a repositionable optical unit containing at least the SLM, projection optics, and a projection lens, the optical unit moveable from a stow position to an operating position at an angle relative to the stow position, wherein the optical unit is both translated and rotated from the stow position to the operating position, the operating position being such that the image formed by the SLM is re-oriented to a position suitable for viewing; and
   a platform unit operable to rest on a flat surface when the projection display system is in use, the platform unit containing all other operating components of the display system, comprising at least an illumination source, a power supply, and a color wheel.

2. The system of claim 1, wherein the optical path components further comprise telecentric prism optics.

3. The system of claim 1, wherein the system is housing no more than two inches in height.

4. The system of claim 1, wherein the system is housed in a housing no more than ten inches on each side.

5. An SLM (spatial light modulator)-based projection display system, comprising:
   a platform unit operable to rest on a flat surface when the projection display system is in use, the platform unit containing all operating components of the display system, namely, at least the SLM, a power supply, an illumination source, and electronics associated with the SLM; and
   a fold mirror in the optical path between the illumination source and the SLM, the fold mirror operable to pop out from the platform unit when the display system is in use, such that the fold mirror redirects light from the illumination source to an optical path leading to the SLM.

6. The system of claim 5, wherein the system is housed in a housing no more than two inches in height.

* * * * *